United States Patent
Laroche et al.

(10) Patent No.: US 8,231,971 B2
(45) Date of Patent: Jul. 31, 2012

(54) PROCESS FOR PRODUCING ANTI-FOG COATING

(75) Inventors: Gaétan Laroche, Québec (CA); Diego Mantovani, Québec (CA); Pascale Chevalier, Québec (CA)

(73) Assignee: Université Laval, Québec (CA)

( * ) Notice: Subject to any disclaimer, the term of this patent is extended or adjusted under 35 U.S.C. 154(b) by 822 days.

(21) Appl. No.: 12/093,916

(22) PCT Filed: Nov. 16, 2006

(86) PCT No.: PCT/CA2006/001872
§ 371 (c)(1),
(2), (4) Date: Dec. 30, 2008

(87) PCT Pub. No.: WO2007/056856
PCT Pub. Date: May 24, 2007

(65) Prior Publication Data
US 2009/0246513 A1    Oct. 1, 2009

Related U.S. Application Data

(60) Provisional application No. 60/736,868, filed on Nov. 16, 2005.

(51) Int. Cl.
*B32B 7/10* (2006.01)
*B32B 27/28* (2006.01)
*C09K 3/18* (2006.01)
(52) U.S. Cl. .... 428/420; 106/13; 156/307.1; 156/307.7; 428/412; 428/507; 428/520
(58) Field of Classification Search ............... 428/420, 428/412, 507, 520; 106/13; 156/307.1, 307.7; 523/169
See application file for complete search history.

(56) References Cited

U.S. PATENT DOCUMENTS

| | | | |
|---|---|---|---|
| 4,170,043 A | 10/1979 | Knight et al. | |
| 5,080,924 A | 1/1992 | Kamel et al. | |
| 5,462,867 A | 10/1995 | Azad et al. | |
| 5,487,920 A | 1/1996 | Lopata et al. | |
| 5,624,711 A * | 4/1997 | Sundberg et al. | 506/32 |
| 5,840,388 A * | 11/1998 | Karger et al. | 428/36.91 |
| 5,922,459 A | 7/1999 | Huang et al. | |
| 6,235,396 B1 * | 5/2001 | Dixon | 428/412 |
| 6,379,753 B1 * | 4/2002 | Soane et al. | 427/434.2 |
| 6,436,481 B1 | 8/2002 | Chabrecek et al. | |
| 6,623,747 B1 | 9/2003 | Chatelier et al. | |
| 6,630,243 B2 | 10/2003 | Valint, Jr. et al. | |
| 6,781,738 B2 | 8/2004 | Kikuchi et al. | |
| 7,179,506 B2 * | 2/2007 | Chen | 427/430.1 |
| 2003/0175323 A1 | 9/2003 | Utterberg et al. | |
| 2009/0142596 A1 * | 6/2009 | Freudenberg et al. | 428/378 |

FOREIGN PATENT DOCUMENTS

| | | | |
|---|---|---|---|
| CA | 207199 A1 | | 6/1992 |
| CA | 2510359 A1 | | 7/2004 |
| GB | 2168622 A | * | 6/1986 |
| JP | 09235544 A | * | 9/1997 |
| WO | WO 00/71611 A1 | | 11/2000 |
| WO | WO 00/71613 A1 | | 11/2000 |

OTHER PUBLICATIONS

"Maleic Anhydride Copolymers A Versatile Platform for Molecular Biosurface Engineering". Tilo Pompe, Stefan Zschoche, Nicole Herold, Katrin Salchert, Marie-Francoise Gouzy, Claudia Sperling, and Carsten Werner. Biomacromolecules 2003 4 (4), 1072-1079 DOI: 10.1021/bm034071c.*
"Covalent Immobilization of Cellulose Layers onto Maleic Anhydride Copolymer Thin Films". Uwe Freudenberg, Stefan Zschoche, Frank Simon, Andreas Janke, Kati Schmidt, Sven Holger Behrens, Helmut Auweter, and Carsten Werner. Biomacromolecules 2005 6 (3), 1628-1634. DOI: 10.1021/bm0492529.*
Schmidt, U., Zschoche, S. and Werner, C. (2003), Modification of poly(octadecene-alt-maleic anhydride) films by reaction with functional amines. Journal of Applied Polymer Science, 87: 1255-1266. doi: 10.1002/app.11527.*
"Multiple hydrophilic polymer ultra-thin layers covalently anchored to polyethylene films". Rafael Silva, Edvani C Muniz, Adley F Rubira. Polymer (2008) vol. 49, Issue: 19, pp. 4066-4075 DOI: 10.1016/j.polymer.2008.07.051.*
"Pulsed Plasma Deposited Maleic Anhydride Thin Films as Supports for Lipid Bilayers". A. T. A. Jenkins, J. Hu Y. Z. Wang, S. Schiller, R. Foerch, and W. Knoll. Langmuir 2000 16 (16), 6381-6384 DOI: 10.1021/la991649o.*
"Characterization of Multilayer Anti-Fog Coatings". Pascale Chevallier, Stephane Turgeon, Christian Sarra-Bournet, Raphael Turcotte, Gaetan Laroche. ACS Applied Materials & Interfaces 2011 3 (3), 750-758 DOI: 10.1021/am1010964.*
Machine translation of JP 09235544 (2011).*
"Surface Modification via Reactive Polymer Interlayers" D. Beyer,T. M. Bohanon,W. Knoll, and, H. Ringsdorf*G. Elender and, and E. Sackmann Langmuir 1996 12 (10), 2514-2518.*
International Search Report for PCT/CA2006/001872, Jan. 25, 2007.

* cited by examiner

*Primary Examiner* — Callie Shosho
*Assistant Examiner* — John Freeman
(74) *Attorney, Agent, or Firm* — Buchanan Ingersoll & Rooney PC

(57) ABSTRACT

The invention relates to an anti-fog coating for a surface of a substrate comprising: a first polymer layer resulting from covalently bonding a polyanhydride polymer to said surface; and a second polymer layer resulting from covalently bonding a polymer selected from the group consisting of polyvinyl alcohol, partially hydrolyzed polyester, polyether and cellulose derivative; said surface having nucleophilic groups. A substrate having an anti-fog coating, as well as a process for preparing said anti-fog coating to the surface of a substrate is also provided.

26 Claims, 1 Drawing Sheet

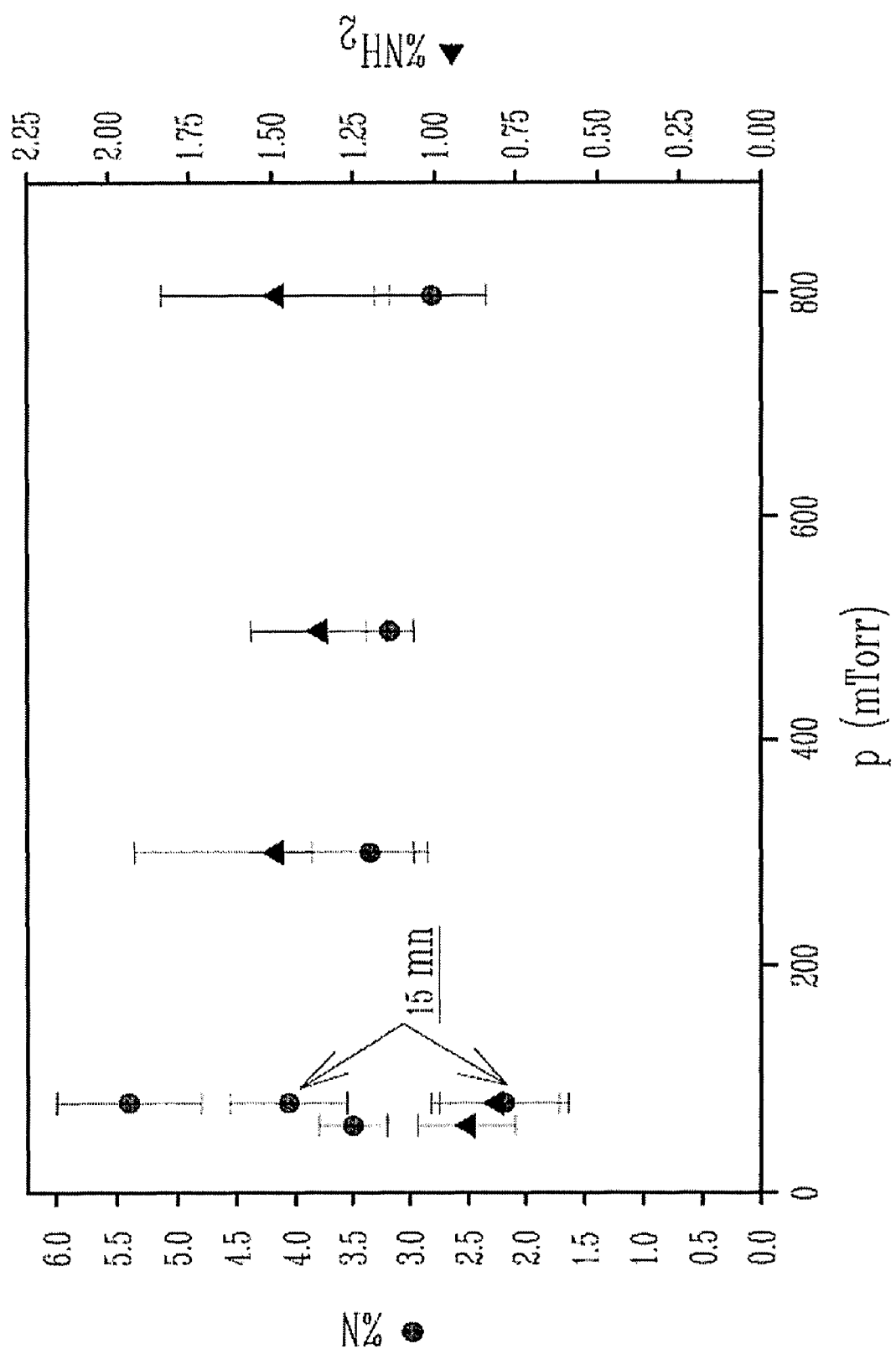

PROCESS FOR PRODUCING ANTI-FOG COATING

CROSS-REFERENCE TO RELATED APPLICATIONS

This application claims the benefit of U.S. provisional application No. 60/736,868 filed Nov. 16, 2005 which is incorporated herein by reference in its entirety.

FIELD OF THE INVENTION

The invention relates to anti-fog coating, process for producing anti-fog coating at the surface of a substrate and substrate having anti-fog coating.

BACKGROUND OF THE INVENTION

The need of an anti-fog treatment for applications on spectacle lenses, visors or sport goggles, military helmets, car windshields, etc., has given rise to the development of varied products. Liquid cleaning solutions are provided by various manufacturers and can be applied on various surface, however they are readily removed by standard washing operation. Films obtained by UV or thermic polymerization of monomer solutions are applied to visors, helmets, ski and protection goggles but they also show limited resistance and their anti-fog properties rapidly fade out.

U.S. Pat. No. 5,922,459 disclose the use of a plasma polymerization deposition process of dimethyldiacetoxysilane (DMDSA) to create a single-layered anti-fog film on glass or plastic lenses.

However, none of all these products and/or techniques makes it possible to obtain a substantially durable anti-fog film at the surface of the material.

There is therefore a great need for a new process providing an anti-fog coating having a more durable character to a surface.

SUMMARY OF THE INVENTION

In one aspect there is provided a process for preparing an anti-fog coating to a surface of a substrate comprising: a) providing nucleophilic groups at the surface of said substrate; b) adding a first polymer layer by covalently bonding a polyanhydride polymer to said surface; and c) adding a second polymer layer by covalently bonding a polymer selected from the group consisting of polyvinyl alcohol, partially hydrolyzed polyvinyl ester, polyether and cellulose derivative.

In one aspect there is provided a process for preparing an anti-fog coating to a surface of a substrate comprising a) providing nucleophilic groups at the surface of said substrate; b) adding a first polymer layer by covalently bonding a polyanhydride polymer to said surface; c) optionally cross-linking said first polymer layer; d) adding a second polymer layer by covalently bonding a polymer selected from the group consisting of polyvinyl alcohol, partially hydrolyzed polyvinyl ester, polyether and cellulose derivative; and e) cross-linking said first and second polymer layers.

In one aspect the present invention is providing an anti-fog coating for a surface of a substrate comprising: a first polymer layer resulting from covalently bonding a polyanhydride polymer to said surface; and a second polymer layer resulting from covalently bonding a polymer selected from the group consisting of polyvinyl alcohol, partially hydrolyzed polyvinyl ester, polyether and cellulose derivative; said surface having nucleophilic groups.

In one aspect, there is also provided a substrate having an anti-fog coating the coating comprising a first polymer layer resulting from covalently bonding a polyanhydride polymer to said surface, and a second polymer layer resulting from covalently bonding a polymer selected from the group consisting of polyvinyl alcohol, partially hydrolyzed polyvinyl ester, polyether and cellulose derivative; said surface having nucleophilic groups adapted to form covalent bonds with the polyanhydride polymer.

BRIEF DESCRIPTION OF THE DRAWING

FIG. 1 represents the influence of pressure and of the plasma treatment time, on the chemical composition at the surface of a substrate.

DETAILED DESCRIPTION OF THE PREFERRED EMBODIMENT

While the making and using of various embodiments are discussed below, it should be appreciated that the specific embodiments discussed herein are merely illustrative of specific ways of making and using the invention and should not be construed as to limit the scope of the invention.

In one embodiment, the process for preparing an anti-fog coating to a surface of a substrate, the anti-fog substrate and anti-fog coating of the present invention comprise those wherein the following embodiments are present, either independently or in combination.

In one embodiment there is provided a process for preparing an anti-fog coating to a surface of a substrate comprising: a) providing nucleophilic groups at the surface of said substrate; b) adding a first polymer layer to said surface by covalently bonding a polyanhydride polymer to said nucleophilic groups; and c) adding a second polymer layer by covalently bonding a polymer selected from the group consisting of polyvinyl alcohol, partially hydrolyzed polyvinyl ester, polyether and cellulose derivative to said first polymer layer.

In one embodiment, the process is comprising: providing nucleophilic groups at the surface of said substrate; adding a first polymer layer by covalently bonding a polyanhydride polymer to said nucleophilic groups; optionally cross-linking said first polymer layer; adding a second polymer layer by covalently bonding a polymer selected from the group consisting of polyvinyl alcohol, partially hydrolyzed polyvinyl ester, polyether and cellulose derivative to said first polymer layer; and cross-linking said first and second polymer layers.

In one embodiment, nucleophilic groups are produced at the surface of a substrate by cold plasma treatment of the substrate. The nucleophilic groups thus produced then allow for covalently bonding polyanhydride polymer to the surface. This plasma treatment technique was developed, especially for the treatment of arterial prostheses made of micro-porous Teflon (ePTFE) (WO 02/070032 A1).

Once the first polymer layer, resulting from covalently bonding a polyanhydride polymer to the substrate surface, has been added, the second polymer layer having anti-fog properties is added. Polyanhydride polymers have the ability to covalently bind with the nucleophilic groups produced at the surface of the substrate as well as bind with the polymer having anti-fog properties (such as polyvinyl alcohol, partially hydrolyzed polyvinyl ester, polyether and cellulose derivatives). Polyanhydrides further have the property of cross-linking which allows for an increased of cohesion and therefore of stability between the molecules and the surface.

In one embodiment, the nucleophilic groups are provided at the surface of said substrate by cold plasma treatment of said substrate.

In one embodiment, the nucleophilic groups are provided at the surface of said substrate by cold plasma treatment of said substrate with a gas plasma selected from $NH_3$, mixture of $N_2/H_2$, $C_{1-8}$alkylamine and mixtures thereof.

As used herein, the term "alkylamine" represents an alkyl which is covalently bonded to the adjacent atom through a nitrogen atom and may be monoalkylamine or dialkylamine, wherein the alkyl groups may be the same or different. The term "alkyl" represents a linear, branched or cyclic hydrocarbon moiety having 1 to 8 carbon atoms, which may have one or more double bonds in the chain when the chain has at least two carbon atoms, and is optionally substituted. Examples include but are not limited to methylamine, dimethylamine, ethylamine, diethylamine, methylethylamine, propylamine, butylamine, pentylamine, hexylamine, or allylamine.

In one embodiment, the nucleophilic groups are provided at the surface of said substrate by cold plasma treatment of said substrate with a gas plasma selected from $H_2O$, $H_2S$ and their mixtures thereof.

In one embodiment, the nucleophilic groups are provided at the surface of said substrate by chemical functionalization. A skilled person in the art will understand that conditions may vary according to the substrate used. For example, glass material may be first treated using an acidic solution (e.g. $H_2SO_4$ and $H_2O_2$) or a basic solution (e.g. aquaregia=solution containing $NH_4OH$ and $H_2O_2$). The conditions must obviously be selected to avoid detrimental effect on the substrate. The substrate is then functionalized using methods known in the art such as aminosilylation (also referred to as aminosiliniziation), thiosilylation, amination, thiolation or hydroxylation as described in one of the exemplary references: Zhang, *Langmuir* (2004), vol. 20, p. 2309; Moon, *Langmuir*, 1997, vol. 13, p 4305; Moon, *Langmuir*, (2000), vol. 16, 2981; Le Proust, *Nucleic Acids Research*, (2001), Vol. 29, p. 2171; Lenigk, *Langmuir*, (2001), Vol. 17, p. 2497. Halliweel et al. *Analytical Chemistry*, (2001), vol. 73, p 2476; Charles, *Langmuir*, (2003), Vol. 19, p 1586, Mansur, *Journal of Materials Science: Materials in Medecine*, (2005), Vol. 16, p 333.

In one embodiment, the nucleophilic group is selected from hydroxyl groups, thiol groups, amino groups, aminosilanes and their mixtures thereof.

In one embodiment, the nucleophilic group is selected from hydroxyl groups, amino groups and their mixtures thereof.

As used herein, the term "amino group(s)" means derivative of ammonia obtained by substituting one or more hydrogen atom and include —$NH_2$, —$NHR_j$ and —$NR_jR_k$, wherein $R_j$ and $R_k$ are each independently selected from hydrogen or $C_{1-6}$ alkyl.

With reference to aminosilane nucleophiles, it is well known that the silane groups of the aminosilane are coupled to the surface of the glass leaving the amino groups projecting therefrom, any aminosilane coupling agent in which the silanol end couples to the glass leaving an amino-functional end for coupling the substrate may be used. The details of the manner of applying the aminosilane are conventional, generally well known, and described in the art. The suitable aminosilane reagents may be described by the general formula:

A-Si-(B)3 wherein A represents an amino functional radical which bonds with the polyanhydride polymer, and B represents a hydrolyzable radical which leads to bonding of the silane silicon atom to the glass surface through bonds such as —SiOSi—, or —AlOSi—.

In the above formula, A typically represents an aminoalkyl radical such as $H_2NCH_2CH_2CH_2$— or $H_2NCH_2CH_2$—NH—$CH_2CH_2CH_2$—. Numerous commercially available aminosilanes are disclosed in the Rahrig U.S. Pat. No. 4,536,360. Examples include: beta-aminomethyltrimethoxysilane; gamma-aminopropyltrimethoxysilane; gamma-methylaminopropyltrimethoxysilane; gamma-ethylaminopropyltrimethoxys ilane; gamma-aminopropyltriethoxysilane; gamma-aminopropyltripropoxysilane; gamma-aminopropylmethyldiethoxysilane; gamma-aminopropylethyldiethoxysilane; N-beta-aminoethylgamma-aminopropyltrimethoxysilane; N-beta-aminoethyl-gamma-aminopropyl-triethoxysilane; gamma-aminopropylphenyldiethoxysilane; gamma-aminoisobutyltrimethoxysilane; delta-aminobutyltriethoxysilane; delta-aminobutylmethyldiethoxysilane; and beta-aminoethyltriethoxysilane.

In one embodiment, the nucleophilic groups are amino groups that are —$NH_2$.

In one embodiment, the nucleophilic groups are thiol groups that are —SH.

In one embodiment, there is at least 0.5% of nucleophilic group at the surface of the substrate.

In one embodiment, there is at least 1% of nucleophilic group at the surface of the substrate.

In one embodiment, there is at least 2% of nucleophilic group at the surface of the substrate.

As used herein, the term "% of nucleophilic group at the surface of the substrate" refers to the concentration of nucleophilic groups measured by surface derivatization followed by X-ray Photoelectron Spectroscopy (XPS) as described in P. Chevallier et al.—*Journal of Physical Chemistry—Part B*, (2001), 105, pp. 12490-12497.

The polyanhydride polymer useful in the present invention are not particularly limited and include without limitation any alternate (alt) or sequential (co) polyanhydride polymer, that possess a sufficient number of anhydride functions to allow bonding between the nucleophilic groups at the surface of the polymer and the polymer having anti-fog properties.

In one embodiment, the polyanhydride polymer is selected from poly(ethylene-alt maleic anhydride), poly(maleic anhydride-alt-1-octadecene), poly(isobutylene-alt-maleic anhydride), poly(styrene-alt-maleic anhydride), poly(methyl vinyl ether-alt-maleic anhydride) and poly[(isobutylene-alt-maleic acid, ammonium salt)-co-(isobutylene-alt-maleic anhydride)].

In a further embodiments:

the polyanhydride polymer is poly(ethylene-alt maleic anhydride);

the polyanhydride polymer is poly(maleic anhydride-alt-1-octadecene);

the polyanhydride polymer is poly(methyl vinyl ether-alt-maleic anhydride).

Table 1 shows typical polyanhydride polymers, their monomeric structures and some physico-chemical properties.

TABLE 1

| Polyanhydride polymer | Solubility | Mw or Mn |
|---|---|---|
| Poly(ethylene-alt-maleic anhydride) PEMA | 10% w/v acetone DMF | $M_w$ 100,000-500,000 |
| Poly(isobutylene-alt-maleic anhydride) PIMA | DMF | $M_w$ ~60,000 |
| Poly(octadecene-alt-maleic anhydride) POMA | 7% w/v THF DMF | $M_n$ 30,000-50,000 |
| Poly[(isobutylene-alt-maleic acid, ammonium salt)-co-(isobutylene-alt-maleic anhydride)] PMA-NH3 | 5% w/v H$_2$O | Mw ~60,000 |
| Poly(methyl vinyl ether-alt-maleic anhydride) PMVE-Ma | 5% w/v DMF THF | MW ~216,000 average Mn ~80,000 |

TABLE 1-continued

| Polyanhydride polymer | Solubility | Mw or Mn |
|---|---|---|
| Poly(styrene-co-maleic anhydride) 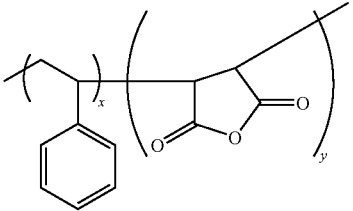 PS-MA | DMF THF Acétone | maleic anhydride 14 wt. % |

The polymers having anti-fog properties useful in the present invention are not particularly limited as far as they provide anti-fog properties to the substrate once they are bonded to the polymer layer obtained from covalently bonding the polyanhydride polymer to said surface.

In one embodiment, the polymer is selected from polyvinyl alcohol, partially hydrolyzed polyvinyl ester, partially hydrolyzed polyvinyl ether and cellulose derivatives.

In one embodiment, the polymer is polyvinyl alcohol or partially hydrolyzed polyvinyl ester.

In one embodiment, the polymer is cellulose derivative selected from methyl cellulose, 2-hydroxyethyl cellulose, cellulose acetate, methyl 2-hydroxyethyl cellulose, chitosan and their mixtures thereof.

In one embodiment, the polymer is cellulose derivative selected from methyl cellulose, 2-hydroxyethyl cellulose, chitosan and their mixtures thereof.

Table 2 shows typical polymers having anti-fog properties that can be bonded to the polymer layer resulting from covalently bonding a polyanhydride polymer to the surface of the substrate.

TABLE 2

| Anti-fog polymers | Solubility | Mw ou Mn |
|---|---|---|
| Polyvinyl alcohol, 98-99% hydrolyzed $-[CH_2-CH(OH)]_n-$ PVA 98% | 1% w/v $H_2O$ | $M_w$ 85,000-124,000 |
| Poly(vinyl alcohol), 87-89% hydrolyzed $(-CH_2CH-)_x(-CH_2CH-)_y$ with OH and $CH_3-C(=O)-O-$ substituents PVA 87% | 2% w/v $H_2O$ | Mw 146,000-186,000 |
| Poly(styrene-co-allyl alcohol) allyl alcohol 40 mol %-Hydroxyl value 255 mg/KOH $[-CH_2CH(C_6H_5)-]_x[-CH_2CH(CH_2OH)-]_y$ PS-AA | 7% w/v DMF 7% w/v THF 8% w/v acetone | Mw ~2,200 Mn ~1,200 |

TABLE 2-continued
| Anti-fog polymers | Solubility | Mw ou Mn |
|---|---|---|
| Methyl cellulose 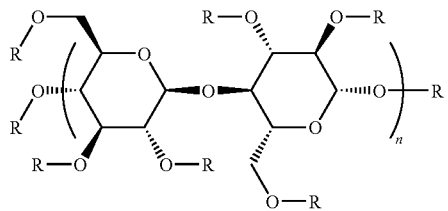 R = CH$_3$ or H  MeCell | 1% w/v H$_2$O | M$_n$ ~40,000 |
| 2-Hydroxyethyl cellulose 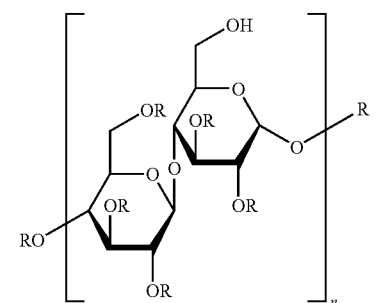 R = H or $(CH_2\text{―}O)_x\text{―}H$  HOCell | 5% w/v H$_2$O | M$_v$ ~90,000 |
| Cellulose acetate- 39.7 wt. % acetyl 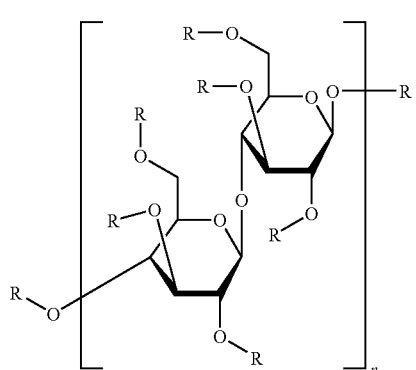 R = H or $\underset{\underset{CH_3}{|}}{\overset{O}{\overset{\|}{C}}}$  AcetCell | 5% w/v H$_2$O 4% w/v DMF 4% w/v THF 4% w/v acetone | M$_n$ ~60,000 |

TABLE 2-continued

| Anti-fog polymers | Solubility | Mw ou Mn |
|---|---|---|
| Methyl 2-hydroxyethyl cellulose 8 wt. % HO(CH$_2$)$_2$, 26 wt. % CH$_3$O | 2% w/v H$_2$O | 0.06-0.50 mol HO(CH$_2$)$_2$/mol cellulose 1.3-2.2 mol CH$_3$/mol cellulose |
| R = (CH$_2$CH$_2$O)$_x$H, CH$_3$ or H MeOHCell | | |
| Chitosan, medium molecular weight Chitosan | 1% w/v solution in 1% acetic acid | Medium molecular weight |

In one embodiment, the second polymer (polymer having anti-fog properties) is bonded to said first polymer layer by spin coating.

In one embodiment, the second polymer (polymer having anti-fog properties) is bonded to said first polymer layer by dip coating.

Spin-coating conditions are typically adjusted on blank surfaces, however the coating can be spread differently when there is presence of previous layers such as more hydrophilic or hydrophobic surface depending on the previous coating applied for example in the cases of commercial spectacles.

In one embodiment the process is further comprising the step of cross-linking said first polymer layer.

In one embodiment the process is further comprising the step of cross-linking said second polymer layer.

In one embodiment the process is further comprising the step of cross-linking said first and second polymer layers.

In one embodiment the step of cross-linking is conducted by heating or exposing to U.V. light. Alternatively other radiation sources may be used (I.R. visible light). In one embodiment, a cross linking agent may be used alone and/or in addition to heating or exposing to light.

A skilled person will understand that an additional step of the present process may further comprise one or more washing and/or drying between each bonding steps to remove the non-covalently bonded polymer.

In one embodiment the substrate is a glass or polymeric substrate.

In one embodiment the polymeric substrate is polycarbonate or plexiglass.

In one aspect there is provided an anti-fog coating comprising: a first polymer layer resulting from covalently bonding a polyanhydride polymer to said surface; and a second polymer layer resulting from covalently bonding a polymer selected from the group consisting of polyvinyl alcohol, partially hydrolyzed polyester, polyether and cellulose derivative to said first polymer layer; said surface having nucleophilic groups adapted to form covalent bonds with the polyanhydride polymer.

In one aspect, there is also provided an anti-fog substrate having at least one surface comprising an anti-fog coating thereon, said coating comprising: a first polymer layer resulting from covalently bonding a polyanhydride polymer to said surface, and a second polymer layer resulting from covalently bonding a polymer selected from the group consisting of polyvinyl alcohol, partially hydrolyzed polyester, polyether and cellulose derivative to said first polymer layer; said surface having nucleophilic groups adapted to form covalent bonds with the polyanhydride polymer.

In one embodiment, the anti-fog coating of the present invention, when applied to a substrate, has a thickness of up to about 90 nm. The thickness of anti-fog coating of the present invention, applied to a substrate should generally not be greater than about one quarter of the visible light wavelength (i.e. from about 350-750 nm) so as not to cause refraction of light.

The present invention will be more readily understood by referring to the following examples which are given to illustrate the invention rather than to limit its scope.

EXAMPLE 1

Optimization of Plasma Treatment

Glass surfaces ($SiO_2$) were used for optimizing the microwave (MW) plasma treatment. Anti-fog coating is often the last applied coating of commercialized lenses, that may have previously received anti-glare and/or anti-scratch treatments.

The first step for producing nucleophilic groups at the surface of a substrate by cold plasma treatment of the substrate requires to control the extent of modifications made to the surface, i.e. select the appropriate balance between what is intended to be produced as nucleophilic groups and the degradation of the material. To achieve this, all the adjustable parameters of the reactor were studied and the extent of modification of the surface assessed after each treatment. XPS analysis were carried out. This analytical technique was described by P. Chevallier et al.—Journal of Physical Chemistry—Part B, (2001), 105, pp. 12490-12497. This approach allowed to optimize the quantity of amines ($NH_2$) thus produced at the surface.

The adjustable parameters of the plasma reactor MW studied were:
  Position of sample with respect to plasma: since work is carried out in post-discharge, i.e. out of the plasma, the sample to be treated may be more or less remote from the plasma discharge, resulting in a different modification of the surface.
  Power of plasma: tests were carried out at 300 W and 100 W.
  Pressure of treatment: Low pressure≦100 mTorr, and elevated pressure>100 mTorr pressure plasma treatments were assessed.
  Treatment time: between 5 to 15 minutes.
  Plasma gas mixture: $N_2/H_2$ plasma gas mixture was used, it was therefore possible to vary the composition of the mixture while keeping a constant final gas flow.

Different plasma treatments showed that the sample could be placed positioned immediately above the plasma discharge. The other parameters were preferably power of 300 W, flow of 10 sscm, gas mixture 70/30 $N_2/H_2$.

By way of example, the influence of pressure in the treatment chamber and of the plasma treatment time, on the chemical composition of the surface, is shown in FIG. 1.

Plasma treatment was carried out on glass surfaces at 300 W, 10 sccm, with a gas mixture of 70% $N_2$/30% $H_2$ at different pressures and for treatment times of 5 minutes, except for the two points at 80 mTorr for which the treatment that was carried out lasted 15 minutes.

A low pressure plasma treatment (p<100 mTorr) produced a quantity of nitrogen (% N-dot) at the surface, that is more important than under elevated pressure (p>100 mToor). However, FIG. 1 showed that the quantity of amino groups that are present at the surface (% $NH_2$-triangle) was more important at elevated pressure (300 to 800 mTorr). On the other hand, it appeared that a 15 min treatment did not promote the formation of amine groups (less than 1% at 15 minutes versus 1.25%-1.5% after 5 minutes). A treatment time of 5 minutes and a pressure of 500 mTorr was selected.

EXAMPLE 2

Covalently Bonding a Polyanhydride Polymer

The following step required to covalently bond a polyanhydride polymer to the nucleophilic groups (in this case —$NH_2$ groups) produced at the surface of the substrate in example 1. In this example, the polyanhydride polymer was poly(ethylene-maleic anhydride) (PEMA).

The glass surface was placed in a 10% w/v of acetone solution of PEMA for 1 hour and under slow stirring. The surface was then removed and rinsed many times with acetone. After drying with air and under vacuum, the surface was analyzed using XPS. Bonding of PEMA to the amino groups was confirmed, the glass surface solely showed carbon (C) and oxygen (O). The $SiO_2$ glass surface was not seen anymore at a depth of XPS analysis of 5 to 10 nm. Many rinsing steps with water were carried out to assess the stability of the PEMA polymer bonding. XPS analysis showed the presence of PEMA polymer at the surface, with a small loss (1-2% of Si of the glass surface was observed).

EXAMPLE 3

Covalently Bonding Polyvinyl Alcohol (PVA)

The next step consisted of bonding the polyvinyl alcohol (PVA) to the polymer layer resulting from covalently bonding PEMA to the glass surface in example 2. PVA was dissolved at 1% w/v in water, i.e. Ig (w) of PVA in 100 mL (v) water. In order to prevent too rapid a hydrolysis of the anhydride functions of PEMA, the solution of PVA was spin-coated on the polymer layer resulting from covalently bonding PEMA to the glass surface prepared.

The spin-coating conditions were previously optimized on a non modified glass surface. The thus obtained surface was dried under vacuum and analyzed by XPS which allowed to conclude that the molecule of PVA was present.

In order to promote the reaction and also to facilitate cross-linking of the products between one another, the surface was thereafter placed in a vacuum drier (15 psi) and at 110° C. during 24 h between each step (i.e. preferably after each layer of polymer). In addition, it was noted that the anti-fog layer was even more stable when cross-linking of the PEMA was conducted in a vacuum drier and at 110° C. before the PVA bonding. The "bonding" and "cross-linking" sequences provided an anti-fog surface that was stable after 5 washings while preserving its anti-fog properties.

A skilled person in the art will appreciate that it is possible to vary the process described above to obtain an anti-fog surface that is stable after 5 washings while preserving its anti-fog properties. For example, the process conditions may vary depending on the polyanhydride polymer and the second polymer layer having anti-fog properties that is selected.

The following conditions were optimized through standard variations as there may be variations in uniformity, homogeneity of the coating produced:
  a) the manner of bonding the polymers at the surface of the substrate using solution under simple stirring or solution by "spin coating" in order to have a coating that is as homogeneous as possible;
  b) the control of the cross-linking steps (within and between polymers as well as with the amine surface);
  c) the desirability of applying single or multi-layers of each polymer to promote stability, and interactions between polymers;
  d) the solubility of each used polymer as this will vary the stability of the coating; and
  e) combination of polymers with one another depending on the solvents, average weight of each polymer, viscosity of the cross-linking solutions.

EXAMPLE 4

Anti-Fog Property Assessment

In absence of standardized testing protocols, two Anti-fog property assays were developed.

Protocol 1—"blowing": i) an individual blew directly at the substrate surface from a distance of 2 cm, and ii) formation (or absence) of fog was assessed. Pictures of the substrate were taken before and after blowing. The substrate was glued in Plexiglas boxes that was considered as negative control and placed on a well textured blue tissue. A loss of visibility of the tissue texture would enable to show the formation of fog, the surface would become fuzzier and there is therefore loss of transparency.

Protocol 2—"cold-hot cycle": i) The substrate was exposed to a cold environment (5 min at −20° C.) and ii) returned to room temperature (+20° C.) and formation (or absence) of fog was assessed. The surface was glued in a Plexiglas box which became the control in that it would fog when placed back at root temperature. The black color of the table receiving the box would help evaluate the clarity of the substrate The first sample tested was a coating of PEMA/PVA on glass. This surface was obtained by bonding PEMA in acetone solution, on a plasma treated glass surface, as described in example 3, and spin-coated with PVA/PEMA/PVA, and cross-linked for 48 h under vacuum at 110° C.

It was observed that the anti-fog coating thus obtained was transparent and did not seem to prejudice glass transparency.

Furthermore, assessment of anti-fog properties following protocol 1 showed that the coated substrate surface remained transparent with no formation of fog as opposed to the uncoated surrounding surface which became fogged.

The protocol 2 assessment was carried out on a glass substrate that was coated as follow: the test was carried out again on the sample described previously, in example 3: bonding of PEMA which is in solution in acetone, on a plasma treated glass surface which is spin-coated with PVA/PEMA/PVA and cross-linked during 48 h under vacuum at 110° C. There was no formation of fog on the thus grafted surface:

EXAMPLE 5

Glass Substrate All Spin-Coating

The same coating as in example 4 was used, however the process was modified in that all the steps after plasma treatment were carried out by spin-coating to verify the influence of the bonding technique used on the anti-fog coating.

It is believed that this technique (all spin coating process) would allow for various types of substrates (non-glass substrate) to be coated by this anti-fog treatment. PEMA being soluble in acetone it turns out that surfaces such as Plexiglas (PMMA) and polycarbonate visors would turn white when in contact with acetone and therefore cannot be allowed to be in the presence of acetone during 1 hour. Coating by spin-coating minimizes the time of contact of this solvent with the surface and the surface therefore has no time to turn white.

A glass substrate was spin-coated with PEMA/PVA/PEMA/PVA (as described in Example 4) using $H_2/N_2$ plasma followed by cross-linking at 110° C. during 48 h and under vacuum (15 psi). The coating seemed less homogeneous, however spin-coating parameters were un-optimized. However, the substrate clearly showed anti-fog properties The substrate remained clear when returned at room temperature.

After 2 min, the fog started to disappear from the Plexiglass box, and there was still no fog on the anti-fog coated glass substrate.

The following examples are examples of anti-fog coating on glass surfaces with different polymer mixtures. Protocol 2 was used to assess the anti-fog properties. In the following examples, no XPS analysis was conducted to verify the presence of the layer between each step. In certain un-optimized examples, partial anti-fog properties were observed, however a skilled person would recognize that optimizing the coating conditions would likely result in satisfactory anti-fog properties.

EXAMPLE 6

Alternative Coating Polymers

The following substrate surfaces were plasma treated using the 70% $N_2$/30% $H_2$ mixture at 500 mTorr and 300 W for 5 minutes (the substrate surface being located just below the plasma discharge tube) followed by treatment with the polymers described in table 3 in a manner similar to example 3 and protocol 2 was used to assess the anti-fog properties.

TABLE 3

| | |
|---|---|
| Surface A | plasma treatment followed by (bonding PEMA and bonding chitosane) |
| Surface B | plasma treatment followed by (bonding PMVE-MA and bonding MeCell) followed by (bonding PMVE-MA and bonding MeCell) |
| Surface C | PVA 98% coated on glass without plasma treatment |

Following the assessment using protocol 2, it was observed that, surface B was partly fogged while surfaces A and C coated with PVA were not fogged. Disparity of the fog on surface B (PMVE-MA+MeCell) was mainly due to the non homogeneity of the coating (visible to the naked eye) and not to the coating per se.

Surface A on the other hand prepared from PEMA and chitosan. Chitosan was selected because of the amino functions present that react more easily with anhydrides compared to alcohol functions found in the other cellulose derivatives. Surface A maintained anti-fog property after washing the surface five times and repeating protocol 2.

EXAMPLE 7

Alternative Coating Polymers

The following substrate surfaces were plasma treated as described in example 6 and treated with the polymers described in table 4 and protocol 2 was used to assess the anti-fog properties after five washes.

TABLE 4

| | |
|---|---|
| Surface D | plasma treatment followed by (bonding PEMA and bonding MeOHCell) |
| Surface E | plasma treatment followed by (bonding POMA and bonding MeCell) followed by (bonding POMA and bonding MeCell) |
| Surface F | plasma treatment followed by (bonding PMA-$NH_3$ and bonding PVA98%) followed by (bonding PMA-$NH_3$ and bonding PVA98%) |
| Surface G | plasma treatment followed by (bonding PMA-$NH_3$ and bonding MeOHCell) followed by (bonding PMA-$NH_3$ and bonding MeOHCell) |

The coating process produced a transparent anti-fog coating. Coated surfaces D and G benefited from partial anti-fog properties whereas surfaces E and F maintained anti-fog properties.

Surfaces D and G had the same anti-fog product (i.e. MeO-HCell) but different polyanhydrides (i.e. PEMA for surface D and PMA-NH$_3$ for surface G. The polyanhydrides per se are likely not responsible for the partial anti-fog properties. It is believed that varying homogeneity may be responsible for variation since different solvents were used, and so were the viscosity of the solution, and the average weight of the polymer. As mentioned before, a skilled person in the art would understand that small technical modifications would permit to achieve the optimized properties. Similar conclusions may be drawn from the comparison of surfaces F (PEMA/PVA coating) and surfaces F and B (MeCell and POMA and PMVE-MA respectively).

A number of other surfaces may be used to apply the anti-fog coating according to the present invention. The following examples are examples of anti-fog coating on a polycarbonate surface (from a helmet visor) as well as one on spectacle lenses in which the last coating was a hydrophobic coating.

EXAMPLE 8

Non-Glass Substrates (Plexiglas)

Polymers commonly used for visors, sport goggles or military helmets include Plexiglas (Polymethylmethacrylate or PMMA) and polycarbonate (PC).

The polycarbonate visor to be coated with anti-fog coating was plasma treated with conditions similar to example 6 followed by bonding of an aqueous solution of PMA-NH$_3$ (by spin-coating), cross-linked during 24 h, coated with PVA 98%, PMA-NH$_3$ and PVA 98%, and cross-linked during 48 h under vacuum at 120° C.

Polycarbonate visor with and without coating were compared using protocol 2.

It was observed that the non-coated visor became highly fogged and non transparent while the visor that was treated according to the invention remained transparent and no fog was formed on the surface. After 3 minutes, the non treated visor began to demist while the treated surface remained perfectly translucent.

The anti-fog coating of the present invention may therefore be applied also to polycarbonate surfaces without modifying their transparency.

EXAMPLE 9

Non-Glass Substrates (Spectacle Lense)

The hydrophobic spectacle lens was plasma treated with conditions similar to example 6 followed by bonding of PEMA solution, bonding with HOCell/PEMA/HOCell solution (spin-coating) and cross-linked for 48 h at 110° C. under vacuum. Anti-fog properties were assessed using protocol 2.

It was observed that the lens presented no alteration of its transparency and possessed anti-fog properties The anti-fog coating of the invention was therefore effective for hydrophobic lenses.

EXAMPLE 10

Chemical Functionalization of Glass Surface

Glass surfaces were also chemically functionalized using an acidic (H$_2$SO$_4$ and H$_2$O$_2$) solution and treated with 3-aminopropyltriethylsiloxane using conditions similar to those described in Zhang, Langmuir (2004), vol. 20, p. 2309; Moon, Langmuir, 1997, vol. 13, p 4305; Moon, Langmuir, (2000), vol. 16, 2981; Le Proust, Nucleic Acids Research, (2001), Vol. 29, p. 2171; Lenigk, Langmuir, (2001), Vol. 17, p. 2497. The surface was spin-coated with PEMA/PVA/PEMA/PVA using conditions similar those above-mentioned with cross-linking under vacuum at 120° C. after each spin coating step. The thus provided coating was resistant to five washes as tested using protocol 1.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. A process for preparing an anti-fog coating on a surface of a substrate comprising:
    a) providing nucleophilic groups at the surface of said substrate, wherein said nucleophilic groups are selected from hydroxyl groups, thiol groups, amino groups, aminosilanes and mixtures thereof;
    b) adding a first polymer layer by covalently bonding a polyanhydride polymer to said nucleophilic groups; and
    c) adding a second polymer layer by covalently bonding a polymer selected from the group consisting of polyvinyl alcohol, partially hydrolyzed polyvinyl ester and polyether to said first polymer layer wherein the polyanhydride is selected from poly(ethylene-alt-maleic anhydride), poly(maleic anhydride-alt-1-octadecene), poly(isobutylene-alt-maleic anhydride), poly(styrene-alt-maleic anhydride), poly(methyl vinyl ether-alt-maleic anhydride) and poly[(isobutylene-alt-maleic acid, ammonium salt)-co-(isobutylene-alt-maleic anhydride)].

2. The process of claim 1, wherein said steps b) and c) are repeated a plurality of times to provide a plurality of said first and second polymer layers.

3. The process of claim 2, wherein said coating has a thickness of up to about 90 nm.

4. The process as defined in claim 1, wherein said polyanhydride polymer is poly(ethylene-alt maleic anhydride).

5. The process as defined in claim 1, wherein the polyanhydride polymer is poly(maleic anhydride-alt-1-octadecene).

6. The process as defined in claim 1, wherein the polyanhydride polymer is poly(methyl vinyl ether-alt-maleic anhydride).

7. The process as defined in claim 1, wherein said nucleophilic groups are selected from hydroxyl groups, thiol groups, amino groups and mixtures thereof.

8. The process as defined in claim 1, wherein said step a) comprises treating said surface with a gas plasma selected from NH$_3$, mixture of N$_2$/H$_2$, alkylamine and mixtures thereof.

9. The process as defined in claim 8, wherein said step a) comprises treating said surface with a gas plasma of a mixture of N$_2$/H$_2$.

10. The process as defined in claim 1, wherein said step a) comprises a chemical functionalization.

11. The process as defined in claim 10, wherein said chemical functionalization comprises aminosilylation.

12. The process as defined in claim 1, wherein there is at least 0.5% of said nucleophilic groups at the surface of the substrate.

13. The process as defined in claim 1, wherein step (b) further comprises the step of cross-linking said first polymer layer.

14. The process as defined in claim 1, wherein step (c) further comprises cross-linking said first and second polymer layers.

15. The process as defined in claim 1, wherein the second polymer is bonded by spin coating.

16. The process as defined in claim 1, wherein the second polymer is bonded by dip coating.

17. A process for preparing an anti-fog coating to a surface of a substrate as defined in claim 1, comprising:
   a) providing nucleophilic groups at the surface of said substrate, wherein said nucleophilic groups are selected from hydroxyl groups, thiol groups, amino groups, aminosilanes and mixtures thereof;
   b) adding a first polymer layer by covalently bonding a polyanhydride polymer to said nucleophilic groups;
   b1) optionally cross-linking said first polymer layer;
   c) adding a second polymer layer by covalently bonding a polymer selected from the group consisting of polyvinyl alcohol, partially hydrolyzed polyvinyl ester and polyether to said first polymer layer; and
   1) when said first polymer layer has been cross-linked in step b1) above, then the process further comprises the step of cross-linking said second polymer layer; or
   2) when said first polymer layer has not been cross-linked in step b1) above, then the process comprises the step of cross-linking said first and second polymer layers.

18. A substrate having an anti-fog coating thereon,
   wherein said substrate has a surface comprising nucleophilic groups selected from hydroxyl groups, thiol groups, amino groups, aminosilanes and mixtures thereof; and
   said coating comprises:
   a first polymer layer resulting from covalently bonding a polyanhydride polymer to said nucleophilic groups, and
   a second polymer layer resulting from covalently bonding a polymer selected from the group consisting of polyvinyl alcohol, partially hydrolyzed polyvinyl ester and polyether to said first polymer layer wherein the polyanhydride is selected from poly(ethylene-alt-maleic anhydride), poly(maleic anhydride-alt-1-octadecene), poly(isobutylene-alt-maleic anhydride), poly(styrene-alt-maleic anhydride), poly(methyl vinyl ether-alt-maleic anhydride) and poly[(isobutylene-alt-maleic acid, ammonium salt)-co-(isobutylene-alt-maleic anhydride)].

19. The substrate as defined in claim 18, wherein said coating comprises a plurality of said first and said second polymer layers.

20. The substrate as defined in claim 18, wherein said coating has a thickness of up to about 90 nm.

21. The substrate as defined in claim 18, wherein the polyanhydride polymer is poly(ethylene-alt maleic anhydride).

22. The substrate as defined in claim 18, wherein the polyanhydride polymer is poly(maleic anhydride-alt-1-octadecene).

23. The substrate as defined in claim 18, wherein the polyanhydride polymer is poly(methyl vinyl ether-alt-maleic anhydride).

24. The substrate as defined in claim 18, wherein said nucleophilic groups are selected from hydroxyl groups, thiol groups, amino groups and mixtures thereof.

25. The substrate as defined in claim 18, wherein said substrate is a glass or a polymeric material.

26. The substrate as defined in claim 25, wherein the polymeric substrate is polycarbonate or polymethylmethacrylate.

* * * * *